United States Patent
Zhang et al.

(10) Patent No.: US 8,200,019 B2
(45) Date of Patent: Jun. 12, 2012

(54) METHOD AND SYSTEM FOR AUTOMATICALLY EXTRACTING PHOTOGRAPHY INFORMATION

(75) Inventors: Byoung-Tak Zhang, Yongin-si (KR); Young-Jin Park, Seoul (KR); Seong-Deok Lee, Suwon-si (KR); Jung-Bae Kim, Hwaseong-si (KR)

(73) Assignees: Samsung Electronics Co., Ltd., Suwon-Si (KR); Samsung Electro-Mechanics Co., Ltd., Suwon (KR)

( * ) Notice: Subject to any disclaimer, the term of this patent is extended or adjusted under 35 U.S.C. 154(b) by 661 days.

(21) Appl. No.: 12/320,897

(22) Filed: Feb. 6, 2009

(65) Prior Publication Data

US 2009/0202157 A1 Aug. 13, 2009

(30) Foreign Application Priority Data

Feb. 13, 2008 (KR) .................. 10-2008-0013061

(51) Int. Cl.
*G06K 9/46* (2006.01)
(52) U.S. Cl. ........................................ 382/190
(58) Field of Classification Search .................. 382/190, 382/313, 118, 224
See application file for complete search history.

(56) References Cited

U.S. PATENT DOCUMENTS

| | | | |
|---|---|---|---|
| 6,301,440 B1 * | 10/2001 | Bolle et al. | 396/128 |
| 6,718,123 B1 * | 4/2004 | Massarsky | 386/200 |
| 7,529,797 B2 * | 5/2009 | Tseng et al. | 709/204 |
| 7,805,066 B2 * | 9/2010 | Wexler et al. | 396/49 |
| 2003/0167264 A1 * | 9/2003 | Ogura et al. | 707/3 |
| 2007/0271297 A1 * | 11/2007 | Jaffe et al. | 707/104.1 |
| 2008/0219559 A1 * | 9/2008 | Koike | 382/190 |

FOREIGN PATENT DOCUMENTS

| | | |
|---|---|---|
| JP | 2007-37168 | 2/2007 |
| KR | 10-2005-0106743 | 11/2005 |
| KR | 10-2007-0036677 | 4/2007 |

* cited by examiner

*Primary Examiner* — Daniel Mariam
(74) *Attorney, Agent, or Firm* — Staas & Halsey LLP

(57) ABSTRACT

A method and system for automatically extracting photography information is provided. The system for automatically extracting photography information includes an image input unit acquiring a preview image or a captured image as an input image, a photography information extraction unit extracting photography information of the input image, and a photography code generation unit generating a photography code indicating a user's photography pattern by using the extracted photography information.

15 Claims, 5 Drawing Sheets

$X_1$: COLOR INFORMATION    $X_4$: POSITION INFORMATION $X_2$: DIRECTION INFORMATION    $X_5$: TEMPERATURE INFORMATION $X_3$: FACE INFORMATION    $X_6$: TIME INFORMATION

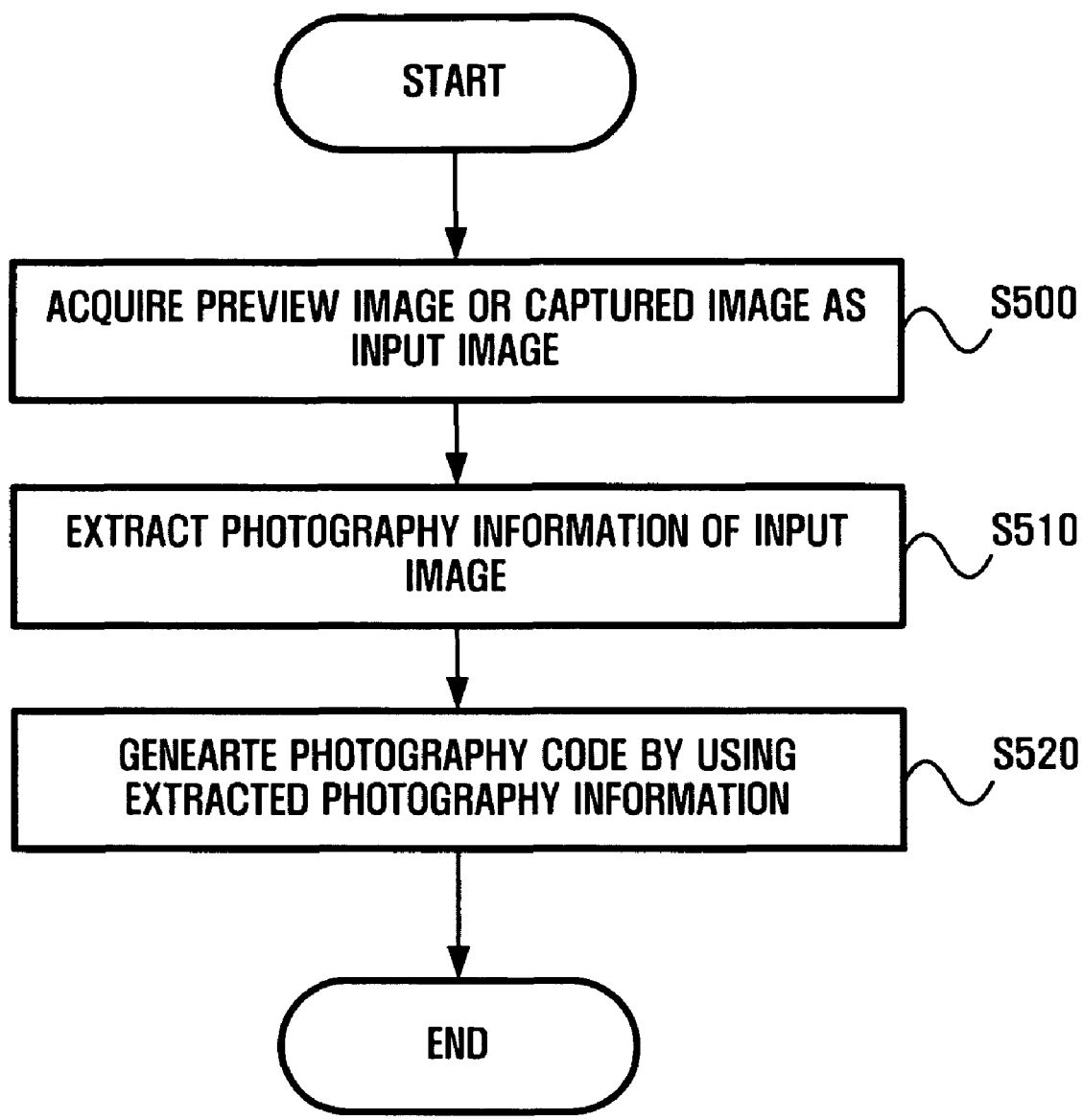

METHOD AND SYSTEM FOR AUTOMATICALLY EXTRACTING PHOTOGRAPHY INFORMATION

CROSS-REFERENCE TO RELATED APPLICATIONS

This application is based on and claims priority from Korean Patent Application No. 10-2008-0013061, filed on Feb. 13, 2008, in the Korean Intellectual Property Office, the disclosure of which is incorporated herein in its entirety by reference.

BACKGROUND

1. Field

Embodiments of the present invention relate to a method and system for automatically extracting photography information, and more particularly to a method and system capable of automatically extracting and providing photography information and extracting a photography pattern by using the extracted photography information.

2. Description of the Related Art

Recently, with the wide spread use of phone cameras, digital cameras, camcorders, and the like, image capturing and acquisition by general users is increasing. For example, a user captures images of himself/herself, other people, or surrounding objects at all times as he/she travels by bus or subway or takes tea or food in a coffeehouse or a restaurant. On the other hand, due to the increase of leisure activities, image capturing of diverse scenes or structures outdoors or abroad is also increasing.

Also, with the activation of peer-to-peer, online shop, user created contents (UCC), and the like, playing or browsing of content acquired by the user through a digital camera, an MP3 player, a digital TV, a personal video recorder (PVR), a portable multimedia player (PMP), etc., is also increasing.

In addition, as large-capacity digital storage devices, such as hard disk drives (HDD), flash memories, and the like, are increasing, the quantities of digital content that can be stored in the storage devices are increasing in geometric progression. Since the capacity of the storage devices is considerably increased in comparison to the conventional storage medium, a user can continuously store various kinds of content captured and acquired by the user in the storage device without the necessity of classifying the content.

On the other hand, the user may record or store his/her private life or footprints by uploading the content captured by the user to a blog, a webpage, a personal web server, and the like. In order to achieve this, however, it is required for the user to individually arrange and upload the digital content in a predetermined folder in accordance with the kind or category of the content, not simply uploading the digital content.

In addition, the user desires to individually classify and browse the content captured and stored by the user. For example, the user has a tendency to classify and arrange the digital content by time, by characters, or by specified categories. However, it may take great effort and time in grouping or labeling a great number of content one by one. Also, since such classification is simply based on categories or time without considering the user's preference or correlations among the content, it is not easy for the user to efficiently access the content.

In addition, since classification of the content captured by the user is referred to by several simple types, it is not easy for the user to present the user preference photography style or recommended photography style.

Accordingly, there is a need for a method and system capable of automatically extracting photography information when a user captures an image through a video device, presenting the user's photography style or recommended photography pattern by combining the photography information from the content captured up to the present, and adaptively classifying the captured content.

SUMMARY

Accordingly, embodiments of the present invention have been made to solve the above-mentioned problems occurring in the prior art, and an object of embodiments of the present invention is to provide a method and system capable of automatically extracting photography information when a user takes a picture.

Another object of embodiments of the present invention is to provide a method and system capable of easily extracting a photography pattern of a user by using photography information when the user takes a picture.

Still another object of embodiments of the present invention is to provide a method and system capable of extracting not only information on a captured image, but also information on the surrounding environment by extracting photography information during image capturing.

Additional aspects and/or advantages will be set forth in part in the description which follows and, in part, will be apparent from the description, or may be learned by practice of the invention.

In order to accomplish these objects, there is provided a system for automatically extracting photography information, according to embodiments of the present invention, which includes an image input unit acquiring a preview image or a captured image as an input image, a photography information extraction unit extracting photography information of the input image, and a photography code generation unit generating a photography code indicating a user's photography pattern by using the extracted photography information.

The photography information extraction unit may extract the photography information including object information on an object that can be acquired from the input image and contextual information indicating a surrounding environment when the input image is acquired.

The object information may include one or more of color information, direction information, face information, and image division information of the input image.

The contextual information may include one or more of position information, season information, temperature information, humidity information, time information, and surrounding brightness information when the input image is acquired.

The photography information extraction unit may include an object information extraction unit extracting color information indicating a color distribution of respective pixels from the input image, extracting direction information from the input image by averaging directions of the respective pixels, and extracting face information based on feature points from the input image, and a contextual information extraction unit extracting position information and time information through a GPS when the input image is acquired, and extracting temperature and humidity information through temperature and humidity sensors when the input image is acquired.

The photography code generation unit may extract one or more feature variables from the extracted photography information, and may generate the photography code by extracting composite feature variables that maximize a composite feature probability by using the extracted one or more feature variables.

In another aspect of embodiments of the present invention, there is provided a method of automatically extracting photography information, which includes acquiring a preview image or a captured image as an input image, extracting photography information of the input image, and generating a photography code indicating a user's photography pattern by using the extracted photography information.

The preview image may exist before the input image, acquired by an image acquisition device, is stored in a storage medium, or the preview image may be viewed by a user before the acquired input image is determined as the captured image and a shutter is pressed.

The photography information may include object information on an object that can be acquired from the input image, and contextual information indicating a surrounding environment when the input image is acquired.

The acquiring may include extracting color information indicating a color distribution of respective pixels from the input image, extracting direction information from the input image by averaging directions of the respective pixels, and extracting face information based on feature points from the input image, and extracting position information and time information through a GPS when the input image is acquired, and extracting temperature and humidity information through temperature and humidity sensors when the input image is acquired.

The generating may comprise extracting one or more feature variables from the extracted photography information, and generating the photography code by extracting composite feature variables that maximize a composite feature probability by using the one or more extracted feature variables.

The method of automatically extracting photography information may further comprise transferring the generated photography code to a photography recommendation unit providing a recommended image having a high correlation with the input image.

In still another aspect of embodiments of the present invention, there is provided an image capturing system through extraction of photography information, which includes an image sensor unit acquiring a preview image or a captured image as an input image, a photography information extraction unit extracting photography information from the input image, and a photography recommendation unit providing one or more recommended images among previous images related to the input image by using the extracted photography information.

The image capturing system may further comprise a photography code generation unit generating a photography code that indicates a user's photography pattern by using the extracted photography information.

The image capturing system may further comprise a profile learning unit updating an image search and recommendation algorithm for receiving the one or more recommended images and extracting a recommended image provided by a user.

The image capturing system may further comprise a photography database storing the input image acquired by the image sensor unit or storing the previous images so that the photography recommendation unit searches for the one or more recommended images.

BRIEF DESCRIPTION OF THE DRAWINGS

These and/or other aspects and advantages will become apparent and more readily appreciated from the following description of the embodiments, taken in conjunction with the accompanying drawings of which:

FIG. 5 is a flowchart illustrating a method of automatically extracting photography information, according to an embodiment of the present invention.

DETAILED DESCRIPTION OF EMBODIMENTS

Figure 1:
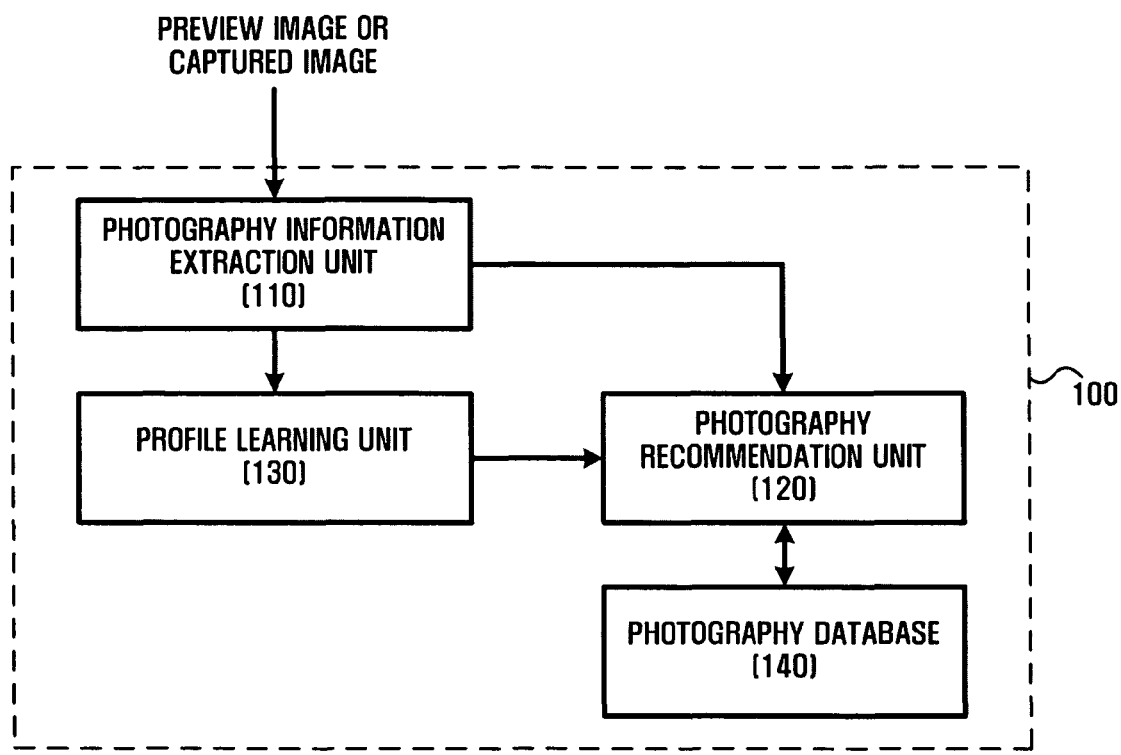
FIG. 1 is a block diagram illustrating the configuration of a photography profile learning system, according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures Embodiments of the present invention will be described herein with reference to the accompanying drawings illustrating block diagrams and flowcharts for explaining a method and apparatus for automatically extracting photography information according to embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

FIG. 1 is a block diagram illustrating the configuration of a photography profile learning system according to an embodiment of the present invention.

Referring to FIG. 1, the photography profile learning system according to an embodiment of the present invention includes a photography information extraction unit 110, a photography recommendation unit 120, a profile learning unit 130, and a photography database 140.

The photography information extraction unit 110 extracts photography information of a preview image or a captured image. Here, the preview image is an image that is shown in advance to a user before the image is stored in a storage medium or before the image is determined as the captured image. Also, the photography information means information, such as the kind of an object (e.g. a character, a building, an animal, a scene, or the like) at the time when the image is captured, the position of an object, time, weather, and the like, at the time when the image is captured. The photography information may include object information and contextual information indicating external conditions, such as a photography pattern, weather, and the like, at the time when the image is captured.

The photography recommendation unit 120 searches for previous images related to the preview image, and extracts one or more recommended images, in which the user's photography patterns are accumulated, among the searched images to recommend to the user the extracted image. For example, the photography recommendation unit 120 searches the photography database 140 by using the acquired photography information, and presents a recommended image which has a high correlation with the preview image, or which is a user preference image.

The profile learning unit 130 serves to update an image search and recommendation algorithm for receiving and extracting the recommended image being provided to the user. Here, the term "profile" means a set of information indicating personal characteristic information of users who search for the information, and is updated by the user's continuous image capturing through the profile learning unit 130.

The profile learning unit 130 continuously updates the profile to present a user preference photography style or a recommended image having a high correlation with the current preview image during the image capturing, and thus a recommended image which suits the personal characteristics of the respective users can be provided.

As described above, according to an embodiment of the present invention, the recommended image that suits the user preference photography pattern can be provided, and the user's photography pattern that continuously evolves with the lapse of time can be reflected in the image search and recommendation algorithm through adaptive learning to cope with the change of the user's photography pattern.

Figure 2:
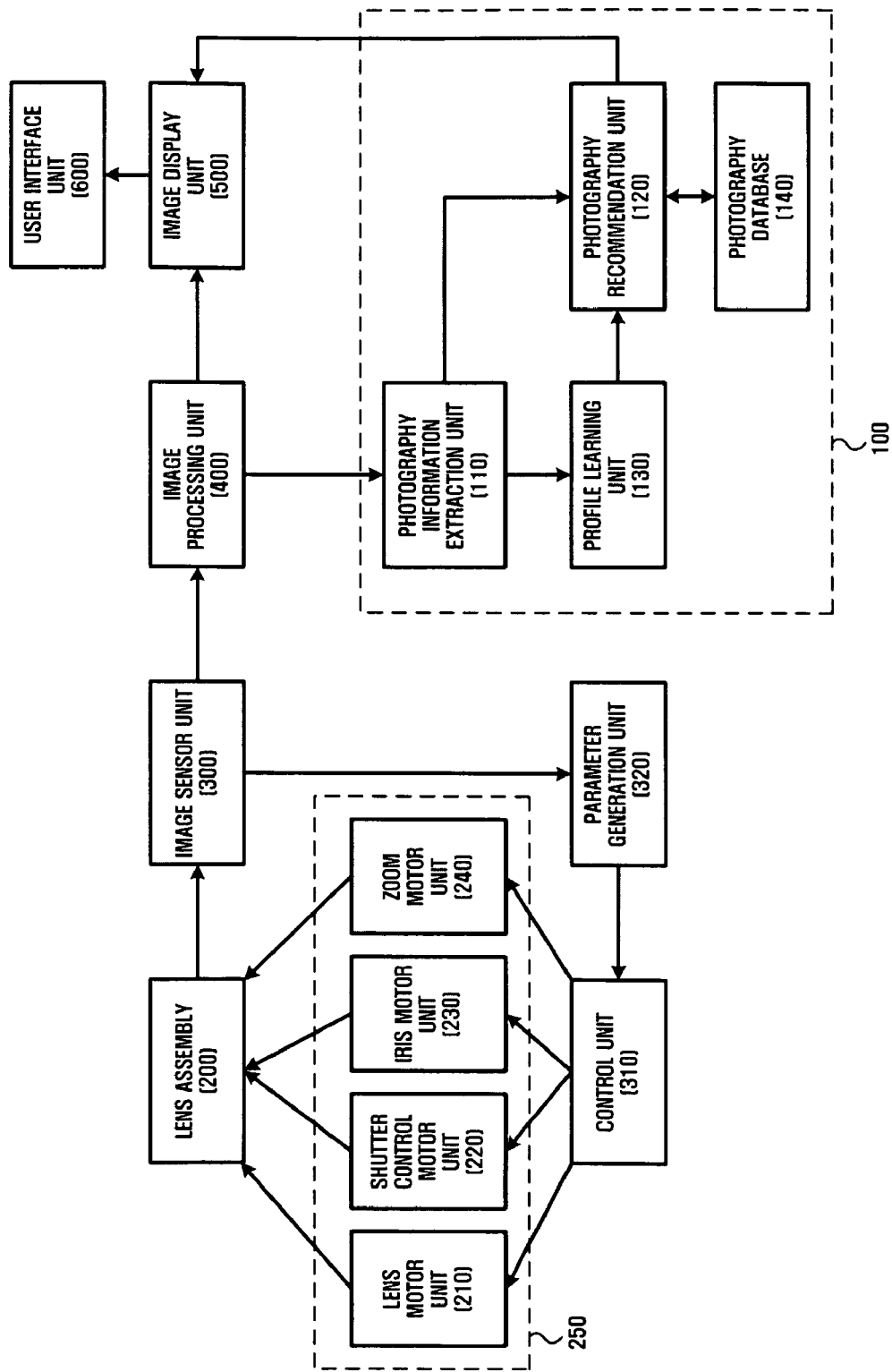
FIG. 2 is a block diagram illustrating the configuration of an image capturing system through extraction of photography information, according to an embodiment of the present invention.

FIG. 2 is a block diagram illustrating the configuration of an image capturing system through extraction of photography information according to an embodiment of the present invention.

Referring to FIG. 2, the user adaptive image capturing system, according to an embodiment of the present invention, may include a lens assembly 200, an image sensor unit 300, an image processing unit 400, an image display unit 500, a control unit 310, a parameter generation unit 320, and a photography profile learning system 100.

The photography profile learning system 100 may include a photography information extraction unit 110, a photography recommendation unit 120, a profile learning unit 130, and a photography database 140. The photography profile learning system receives the preview image or the captured image from the image processing unit 400, extracts the photography information by using the input image, and presents one or more recommended images having a high correlation. The photography profile learning system 100 is able to provide a recommended image, which suits the current preview image or captured image from the previously captured image, to the user by continuously updating the user's photography pattern through the profile learning.

The lens assembly 200 may include a plurality of lenses (not illustrated) that serve to condense incident light reflected from an object. The image of the object is in the form of a light signal. The lens assembly 200 may further include a sensor (not illustrated) for sensing shake of an image capturing device and a communication module drive unit (not illustrated) providing communications among multiple image capturing devices in a multi image capturing environment.

The image sensor unit 300 serves to detect the light concentrated by the lens assembly 200, and to convert the light into an electric image signal. That is, the image sensor unit 300 senses the image of the object incident through lenses, and converts the sensed image into an electric signal to acquire the image. The image sensor unit 300 has a sensing region corresponding to the lens. That is, the light having passed through the lens is sensed in the sensing region to acquire the image.

On the other hand, the image sensor unit 300 includes a charge coupled device (CCD) converting the image signal of the object incident through the lens assembly 200 into an electric signal, an analog-to-digital converter converting the electric signal into a digital signal, and a digital signal processor (DSP) receiving and processing the digital signal converted by the analog-to-digital converter.

The parameter generation unit 320 serves to generate parameters for controlling the image capturing device. Generally, the image capturing device uses 3A parameters, i.e. auto exposure (AE), auto focus (AF), auto white balance (AWB) control parameters. By using the 3A parameters, an exposure time, an iris, a flash operation, a focus, a white balance, a metering mode, and the like, can be controlled.

The parameter generation unit 320 generates and transmits parameters to the control unit 310 so that the control unit controls the lens drive unit 250 in order to generate a high-quality image. The lens drive unit 250 may include a lens motor unit 210, a shutter control motor unit 220, an iris motor unit 230, and a zoom motor unit 240, and operates respective constituent elements of the lens drive unit 250 in accordance with the parameters transferred from the control unit 310.

The control unit 310 generates control signals for controlling the lens drive unit 250 through the parameters transmitted from the parameter generation unit 320. For example, the control unit 310 controls the lens motor unit 210 to control auto focus (AF), and controls the shutter control motor unit 220 or the lens motor unit 210 to perform auto exposure (AE). The input image corrected through the above-described process is finally processed by the image processing unit 400 via the image sensor unit 300, and then the processed image is stored.

The control unit 310 may also serve to control other constituent elements of the user adaptive image capturing system according to an embodiment of the present invention, for example, the image sensor unit 300, the parameter generation unit 320, the image processing unit 400, the image display unit 500, and a user interface unit 600.

The image processing unit 400 serves to process the input image by using the parameters. That is, the image processing unit 400 generates the image to be finally stored in the form of a file by using the parameters generated by the parameter generation unit 320 in a preview process. For example, the image processing unit 400 adjusts white color balancing of the whole image through a gain adjustment by using an auto white balancing (AWB) parameter, or finally generates the image by reducing noise and improving the image details. The image generated through the image processing unit 400 is outputted to the image display unit 500, so that the user can view the captured image.

The image display unit 500 serves to output the input image of the object captured through the lens assembly or the input image in a preview state. The image display unit 500 may be implemented by a general Liquid Crystal Display (LCD), a Plasma Display Panel (PDP), an Organic Light Emitting Diode (OLED) display, or an existing display panel. The image display unit 500 includes a display drive unit (not illustrated) outputting the input image of the object captured through the lens assembly 200 or the input image in a preview state. The display drive unit may be connected to the DSP. For example, the display drive unit processes the input digital image signal converted by the analog-to-digital converter, and outputs the processed image signal to the image display unit 500 to display the image signal.

The user interface unit 600 serves to extract image information from the input image outputted from the image display unit 500. The image information includes a user input of a picture quality grade of the input image, metadata of the image, and image data information extracted from the image data, which will be described in more detail later.

Preferably, the user interface unit 600 is connected to the image display unit 500 outputting the input image. The user interface unit 600 may be implemented by a touch screen panel and so on.

Figure 3:
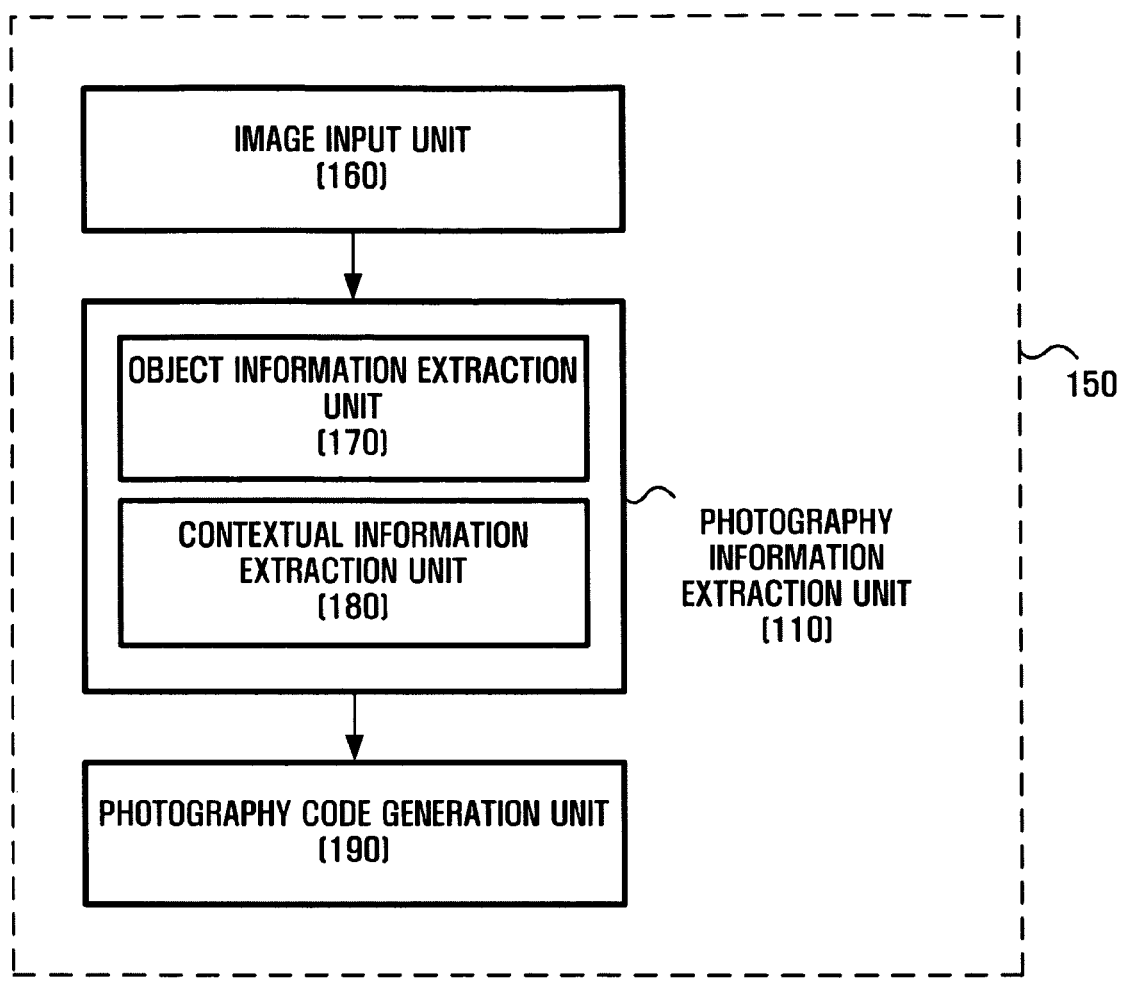
FIG. 3 is a block diagram illustrating the configuration of a system for automatically extracting photography information, according to an embodiment of the present invention.

FIG. 3 is a block diagram illustrating the configuration of a system for automatically extracting photography information according to an embodiment of the present invention.

Referring to FIG. 3, the system 150 for automatically extracting photography information according to an embodiment of the present invention may include an image input unit 160, a photography information extraction unit 110, and a photography code generation unit 190.

The image input unit 160 receives the image acquired through the image sensor unit 300 (FIG. 2). The acquired input image is an image picked up by the light sensed by the image sensor unit 300 (FIG. 2) through the lens assembly 200 (FIG. 2) during the user's image capturing. Accordingly, the input image may be the preview image that is displayed through the image display unit 500 (FIG. 2) before the image is captured or the image already captured and stored in a storage medium.

The photography information extraction unit 110 extracts the photography information of the input image during the image capturing. Here, the photography information includes object information and contextual information. The photography information extraction unit 110 includes an object information extraction unit 170 and a contextual information extraction unit 180.

The object information extraction unit 170 extracts information on the object extracted from the input image itself, e.g. color information, direction information, face information, image division information, and the like, as the object information.

For example, the color information means a color distribution indicated through a judgment of which group, in a predetermined color space, colors belong to, for colors in the unit of a pixel or a block of the input image. If it is assumed that 12 colors exist in the color space, the color information indicating the color distribution in the whole input image can be acquired by classifying the color in the unit of a pixel or a block into one of the 12 colors.

The direction information is information indicating the general direction of the input image. For example, the direction information is acquired by using a histogram derived by applying a Gabor filter.

The Gabor filter is a linear filter of which the impulse response may be determined through multiplication of a Gauss function and a harmonic function, and for example, may be defined by the below Equation (1), for example.

$$g(x, y; \lambda, \theta, \psi, \sigma, \gamma) = \exp\left(-\frac{x'^2 + \gamma^2 y'^2}{2\sigma^2}\right) \cdot \cos\left(2\pi \frac{x'}{\lambda} + \psi\right) \quad \text{Equation 1}$$

Here, x and y are coordinate values indicating a pixel position on horizontal and vertical axes in the input image. $\lambda$ is a wavelength of a cosine factor, $\theta$ is a direction value of the Gabor filter, $\Psi$ is a phase difference, $\sigma$ is the standard deviation of the Gauss function, and $\gamma$ is a parameter describing the shape of an ellipse.

By applying Equation (1) and changing the value $\theta$ that indicates the direction of the filter in Equation (1), the direction of the input image can be obtained. Accordingly, by averaging the directions of the whole input image, being extracted in the unit of a pixel, the direction of the input image can be obtained. In addition, in order to briefly classify the direction of the image into several directions, a histogram may be generated in accordance with a quantized direction range. Accordingly, the quantized direction can be obtained in accordance with the generated histogram. For example, if the direction of the image is classified at intervals of 30° by the histogram, the classified directions become directions of 0°, 30°, 60°, 90°, 120°, and 150°. If the histogram in the direction of 60° is large, the input image may be in the direction of 60° as a whole.

The face information includes face color information, character information, and the like. For example, if it is assumed that the face information is the character information appearing in the input image, a face is first extracted from the input image, and then a specified character is searched for from the extracted face. Accordingly, the face information may be extracted in a manner that a rough face region is extracted by extracting basic constituent elements of the face, such as eyes, a nose, a mouth, and the like, from the input image, and then feature points, such as eyes, are extracted from the extracted face region. At this time, in order to clearly discriminate the extracted feature points by faces, the Gabor filter is applied to the extracted feature points, and thus the face recognition capability is improved. Techniques of extracting face information from an input image have been described in detail in Korean Patent Unexamined Publication Nos. 2005-0013467, 2006-0008814, and 2007-0047063.

The image division information means information on a plurality of regions appearing in the input image. Various existing techniques may be applied to the image division in the input image. For example, by applying a mean shift segmentation technique, the number of divided regions and the size distribution thereof may be acquired as the image division information.

The contextual information extraction unit 180 acquires the contextual information through diverse sensors when the image is captured. The contextual information extraction unit 180 extracts the contextual information indicating the information of the real world at the time of image capturing, and the extraction of the contextual information is performed through diverse sensors.

For example, the contextual information includes position information, season information, temperature information, humidity information, time information, surrounding brightness information, and the like, when the image is captured. Here, the position information, the season information, and the time information may be acquired through a global positioning system (GPS), and the temperature information and the humidity information may be acquired through a temperature sensor and a humidity sensor. Also, the surrounding brightness information may be acquired through a photometry sensor. The above-described sensors are mounted on an input image acquisition device or a user adaptive image capturing system according to an embodiment of the present invention. Also, in the case where the input image acquisition device or the user adaptive image capturing system according to an embodiment of the present invention is connected to a base station or a repeater in a communication network, or to a sensor network, the position of the device or the system may be estimated through the communication network or the sensor network, and the contextual information in the corresponding position may be extracted and transmitted to the input image acquisition device or the user adaptive image capturing system according to an embodiment of the present invention.

The photography code generation unit 190 generates photography codes based on the extracted photography information. The photography code generation unit 190 generates one or more photography codes by using the extracted object information and contextual information. Here, the photography code means a code generated by composite feature variables that are extracted through a combination of k feature variables among n feature variables ($x_i$, i=1, . . . , n) selected based on the photography information. In addition, the photography code is specified as one or more composite feature variables that maximize the likelihood of the input image based on the photography information extracted from the input image. Accordingly, by generating the photography codes by one or more composite feature variables, the photography codes indicating the user's photography pattern based on the input image can be provided. If the photography codes are generated, the user can easily find the recommended image having a high correlation with the current input image from the photography database 140 (FIG. 2).

The system 100 for automatically extracting photography information according to an embodiment of the present invention transfers the generated photography codes to the photography recommendation unit 120 (FIG. 2). The photography recommendation unit 120 (FIG. 2) can grasp the user's photography pattern of the input image through the transferred photography codes, without analyzing the photography information, and thus the photography recommendation unit 120 (FIG. 2) easily searches for and provides the recommendation image to the user.

As described above, according to an embodiment of the present invention, when the image acquisition device or the user adaptive image capturing system acquires the preview image or the captured image as the input image, it can acquire the photography information including the object information and the contextual information from the input image. Also, the image acquisition device or the image capturing system extracts the user's photography codes having a high correlation with the input image based on the acquired photography information, and extracts the user's photography pattern from the input image.

Figure 4:
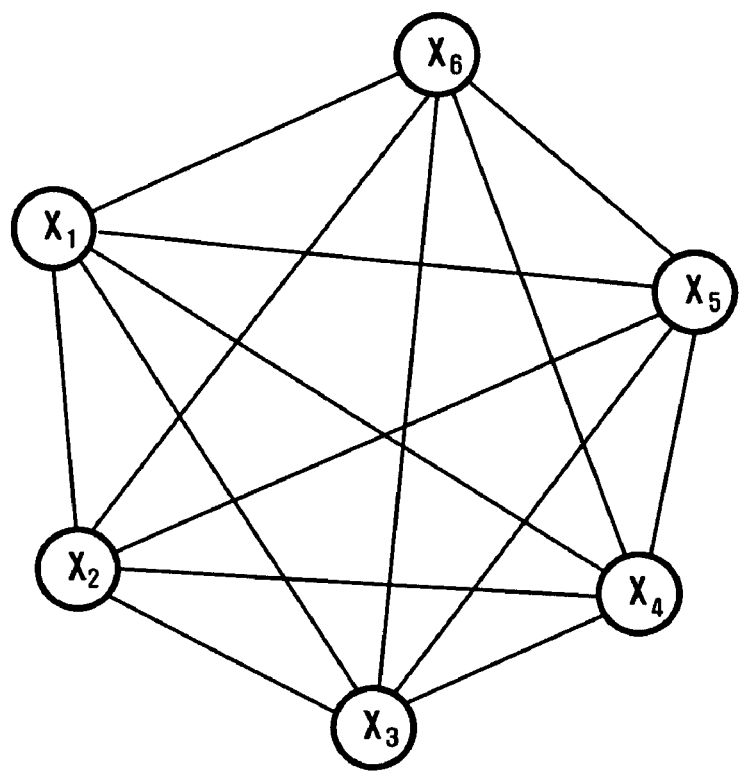
FIG. 4 is a view showing an example of photography code generation in a system for automatically extracting photography information, according to an embodiment of the present invention according to an embodiment of the present invention.

FIG. 4 is a view showing an example of photography code generation in a system for automatically extracting photography information according to an embodiment of the present invention.

As illustrated in FIG. 4, it is assumed that the photography information that includes the object information and the contextual information has 6 feature variables with respect to the input image. For example, color information, direction information, and face information may constitute object information, and position information, temperature information, and time information may constitute contextual information. However, the respective feature variables constituting the object information and the contextual information are merely exemplary, and various object information and contextual information can be acquired by various techniques of extracting the object information from the input image and extracting the contextual information through various sensors.

For example, color information $x_1$, direction information $x_2$, and face information $x_3$ may exist as the feature variables constituting the object information, and position information $x_4$, temperature information $x_5$, and time information $x_6$ may exist as the feature variables constituting the contextual information. Accordingly, by using or combining the respective feature variables, a composite feature variable can be produced. For example, by combining the color information, the direction information, the temperature information, and the time information, a composite feature variable $x_1 x_2 x_5 x_6$ is produced, and by combining the color information, the direction information, the face information, the position information, the temperature information, and the time information, a composite feature variable $x_1 x_2 x_3 x_4 x_5 x_6$ is produced.

The composite feature variable $X^{(n)}$ may be expressed as a composite feature probability value by the below Equation (2), for example.

$$P(X^{(n)} \mid W) = \frac{1}{Z(W)} \exp\left[\sum_{k=2}^{K} \frac{1}{c_k} \sum_{i_1 i_2, \ldots, i_k 1} w^{(k)}_{i_1 i_2 \ldots i_k 1} x^{(n)}_{i_1}, x^{(n)}_{i_2}, \ldots, x^{(n)}_{i_k}\right] \quad \text{Equation 2}$$

Here, x denotes a composite feature variable, w denotes a weight value for one composite feature variable, and Z(W) denotes a constant standardizing the probability value P. $c_k$ denotes the number of combinations that can constitute the k-th order composite feature variable through selection of k feature variables among n feature variables, and can be calculated by the below Equation (3), for example.

$$c_k = \binom{n}{k} = \frac{n!}{k!(n-k)!} \quad \text{Equation 3}$$

Accordingly, in order to generate the photography code by using the photography information extracted from the input image, the composite feature variable having the probability value of Equation (2) as its maximum value is extracted. If a local maximum value is acquired by taking a partial derivative with respect to the weight value as in the below Equation (4), for example, the composite feature variable corresponding to the weight value can be extracted as the photography code.

$$\frac{\partial}{\partial w_{i_1 i_2 \ldots i_k}^{(k)}} \ln P(X^{(n)} | W) = 0 \quad \text{Equation 4}$$

In order to calculate Equation (4), an existing optimal technique, such as a least square method, a Markov Chain Monte Carlo technique, or the like, may be used.

As described above, by introducing the composite feature variable composed of a high-order term, in addition to a linear analysis, the user's photography pattern can be easily extracted from the user photography information.

FIG. 5 is a flowchart illustrating a method of automatically extracting photography information according to an embodiment of the present invention.

Referring to FIG. 5, the image acquisition device or the user adaptive image capturing system according to an embodiment of the present invention acquires the preview image or the captured image as the input image S500. Here, the preview image is an image that is previewed by the user before the image is stored in a storage medium or before the image is determined as the captured image and a shutter is pressed.

If the input image is acquired, the photography information of the input image is extracted S510. Here, the photography information is information including the object information and the contextual information of the input image. The object information is information on the object that can be acquired from the input image itself, and includes, for example, color information, direction information, face information, image division information, and the like.

The contextual information is information indicating a surrounding environment when the input image is captured, and includes, for example, position information, season information, temperature information, humidity information, time information, surrounding brightness information, and the like. The context information is extracted through diverse sensors.

If the photography information is extracted, the photography codes are generated by using the extracted photography information S520. The photography code is specified as one or more composite feature variables that representatively indicate the user's photography pattern based on the photography information extracted from the input image. Accordingly, the photography codes are generated by extracting one or more composite feature variables that maximize the likelihood of the input image in view of the user's photography pattern by using the extracted photography information.

As described above, according to the method and system for automatically extracting photography information of the present invention, object information of the input image and contextual information indicating the surrounding environment during the capturing of the input image can be extracted. Also, by using the extracted photography information, a photography code capable of indicating the user's photography pattern can be generated by using the extracted photography information. By generating the photography code, the user's photography pattern can be easily determined, and a recommended image having a high correlation with the input image among the previously captured images can be easily searched and provided from the photography database.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A system for automatically extracting photography information, comprising:
    an image input unit to acquire a preview image or a captured image as an input image;
    a photography information extraction unit to extract photography information of the input image;
    a photography code generation unit to generate a photography code indicating a user's photography pattern by using the extracted photography information; and
    a photography recommendation unit to search for previous images related to the input image, and to extract one or more recommended images, having a high correlation with the input image, based on the generated photography code.

2. The system of claim 1, wherein the photography information extraction unit extracts the photography information including object information on an object that can be acquired from the input image and contextual information indicating a surrounding environment when the input image is acquired.

3. The system of claim 2, wherein the object information includes one or more of color information, direction information, face information, and image division information of the input image.

4. The system of claim 2, wherein the contextual information includes one or more of position information, season information, temperature information, humidity information, time information, and surrounding brightness information when the input image is acquired.

5. The system of claim 1, wherein the photography information extraction unit comprises:
    an object information extraction unit extracting color information indicating a color distribution of respective pixels from the input image, extracting direction information from the input image by averaging directions of the respective pixels, and extracting face information based on feature points from the input image; and
    a contextual information extraction unit extracting position information and time information through a GPS when the input image is acquired, and extracting temperature and humidity information through temperature and humidity sensors when the input image is acquired.

6. The system of claim 1, wherein the photography code generation unit extracts one or more feature variables from the extracted photography information, and generates the photography code by extracting composite feature variables that maximize a composite feature probability by using the extracted one or more feature variables.

7. An image capturing system through extraction of photography information, comprising:
- an image sensor unit to acquire a preview image or a captured image as an input image;
- a photography information extraction unit to extract photography information from the input image; and
- a photography recommendation unit to provide one or more recommended images among previous images related to the input image by using the extracted photography information,
- wherein a predetermined technique is applied to the extracted photography information to determine the one or more recommended images.

8. The image capturing system of claim 7, further comprising a photography code generation unit generating a photography code that indicates a user's photography pattern by using the extracted photography information.

9. The image capturing system of claim 7, further comprising a profile learning unit updating an image search and recommendation algorithm for receiving the one or more recommended images and extracting a recommended image provided by a user.

10. The image capturing system of claim 7, further comprising a photography database storing the input image acquired by the image sensor unit or storing the previous images so that the photography recommendation unit searches for the one or more recommended images.

11. A method of automatically extracting photography information, comprising:
- acquiring a preview image or a captured image as an input image;
- extracting photography information of the input image;
- generating a photography code indicating a user's photography pattern by using the extracted photography information; and
- transferring the generated photography code to a photography recommendation unit providing a recommended image having a high correlation with the input image, based on the generated photography code.

12. The method of claim 11, wherein the preview image exists before the input image, acquired by an image acquisition device, is stored in a storage medium, or the preview image is viewed by a user before the acquired input image is determined as the captured image and a shutter is pressed.

13. The method of claim 11, wherein the photography information includes object information on an object that can be acquired from the input image, and contextual information indicating a surrounding environment when the input image is acquired.

14. The method of claim 11, wherein the acquiring comprises:
- extracting color information indicating a color distribution of respective pixels from the input image, extracting direction information from the input image by averaging directions of the respective pixels, and extracting face information based on feature points from the input image; and
- extracting position information and time information through a GPS when the input image is acquired, and extracting temperature and humidity information through temperature and humidity sensors when the input image is acquired.

15. The method of claim 11, wherein the generating comprises:
- extracting one or more feature variables from the extracted photography information; and
- generating the photography code by extracting composite feature variables that maximize a composite feature probability by using the one or more extracted feature variables.

* * * * *